US011436952B1

United States Patent
Richards (10) Patent No.: US 11,436,952 B1
(45) Date of Patent: Sep. 6, 2022

(54) DIRECT VIEW LED STAND FOR CINEMA THEATERS AND ACCESSORIES THEREFOR

(71) Applicant: MOVING IMAGE TECHNOLOGIES, LLC, Fountain Valley, CA (US)

(72) Inventor: David Richards, Costa Mesa, CA (US)

(73) Assignee: MOVING IMAGE TECHNOLOGIES, INC., Fountain Valley, CA (US)

( * ) Notice: Subject to any disclaimer, the term of this patent is extended or adjusted under 35 U.S.C. 154(b) by 4 days.

(21) Appl. No.: 17/109,563

(22) Filed: Dec. 2, 2020

Related U.S. Application Data (60) Provisional application No. 62/942,974, filed on Dec. 3, 2019.

(51) Int. Cl.
| | |
|---|---|
| *G09F 9/302* | (2006.01) |
| *F21V 19/00* | (2006.01) |
| *G09F 9/33* | (2006.01) |
| *G06F 1/16* | (2006.01) |
| *F21K 9/20* | (2016.01) |

(52) U.S. Cl.
CPC ............ *G09F 9/3026* (2013.01); *F21K 9/20* (2016.08); *G06F 1/1601* (2013.01); *G06F 1/1607* (2013.01); *G09F 9/33* (2013.01)

(58) Field of Classification Search
CPC . G09F 9/3026; G09F 9/33; F21K 9/20; G06F 1/1601
See application file for complete search history.

(56) References Cited

U.S. PATENT DOCUMENTS

| | | | |
|---|---|---|---|
| RE31,684 E | 9/1984 | Yeiser | |
| 4,710,819 A | 12/1987 | Brown | |
| 8,724,298 B2 * | 5/2014 | Delva | F16M 11/10 248/65 |
| 9,378,671 B2 | 6/2016 | Kline et al. | |
| 11,150,855 B2 * | 10/2021 | Monsees | F16M 13/02 |

(Continued)

FOREIGN PATENT DOCUMENTS

WO    2015/103079 A1    7/2015

*Primary Examiner* — Tracie Y Green
(74) *Attorney, Agent, or Firm* — Westman, Champlin & Koehler, P.A.; Z. Peter Sawicki; Amanda M. Prose (57) ABSTRACT

A modular frame for supporting one or more LED panels to form a video wall, a leveling system for the video wall, and a calibration and/or cleaning system for the LED panels of the video wall. The modular frame is a framework comprising at least two support columns, a primary support beam and at least one secondary support beam wherein the at least two support columns are spaced apart with the primary support beam extending substantially laterally thereacross, and a plurality of stiffening elements. The at least one secondary support beam is an articulated support beam for suspending a column of one or more LED panels therefrom and wherein the articulation point of each of the at least one secondary support beams as connected to the primary support beam is substantially centered over the center of mass of the one or more LED panels suspended therefrom. A plurality of modular frames can be secured together to form the video wall of a selected width and height with LED panels suspended in one or more rows and one or more columns.

17 Claims, 7 Drawing Sheets

(56) References Cited

U.S. PATENT DOCUMENTS

| | | | | |
|---|---|---|---|---|
| 2008/0266206 | A1* | 10/2008 | Nelson | G09F 9/3026 345/1.3 |
| 2013/0093647 | A1 | 4/2013 | Curtis et al. | |
| 2015/0187237 | A1* | 7/2015 | Hall | G09F 9/3023 29/825 |
| 2020/0372841 | A1* | 11/2020 | Mudd | G09F 9/3026 |

* cited by examiner

FIG. 1

FIG. 2
*not to scale

DIRECT VIEW LED STAND FOR CINEMA THEATERS AND ACCESSORIES THEREFOR

CROSS-REFERENCE TO RELATED APPLICATION

This application is based on and claims the benefit of U.S. provisional application Ser. No. 62/942,974, filed Dec. 3, 2019, the content of which is hereby incorporated in its entirety.

BACKGROUND

This disclosure relates to modular frames for supporting LED panels and in particular to modular frames supporting very large LED panels and panel arrays.

Large Arrays of light emitting diodes (LEDs) are assembled into rectangular panels that are then assembled together to create large displays for showing moving video images. These systems are used in advertising (e.g. electronic billboards) and various types of entertainment, including screens for showing motion pictures to an audience. A common method of mechanically supporting such "video walls" includes erecting a support frame having horizontal beams and vertical columns and suspending the LEDs panels from the top of the frame.

With these prior art frames, the LEDs must remain aligned with precise accuracy to avoid perceptible artifacts in the image. A perfectly straight structural beam is required at the top of the frame to suspend the LED panels in order to keep the panels in this precise alignment. The support element must be many feet long, perhaps 50 feet or more, and support several tons or more of load distributed along it, with little or no deflection effects resulting from that load. With these systems it is not possible to create a practical beam that is perfectly straight and sufficiently strong such that it will not deflect when the weight of the LED panels is applied to it.

With any rectilinear framing system, it is important to ensure the horizontal and vertical frame members are very nearly orthogonal to one another to maintain the intended design strength. As columns deviate from vertical, the strength of the frame is reduced. This is especially important with regard to a frame supporting a heavy load. In the current art, it is typical to use turnbuckles, winches, "come-alongs," and like equipment to pull the frame members in various directions during assembly, to keep vertical members truly vertical and orthogonal to the horizontal frame members. This is cumbersome and time consuming.

Means are also required for securing the support frame to the wall of the building in a rigid, structurally sound manner while still allowing adjustment for aligning the frame straightness as mentioned above.

There are power and data electrical connections to the LED panels also required. A means is necessary to deliver these connection cables to the rear of the LEDs without creating an impediment or trip hazard to the personnel working behind the display.

SUMMARY

An aspect of the present disclosure relates to a modular frame for supporting one or more LED panels to form a video wall. Each modular frame has a framework comprising at least two support columns, a primary support beam and at least one secondary support beam. When installed, each modular display has at least two support columns spaced apart with the primary support beam extending substantially laterally thereacross, and a plurality of stiffening elements for forming the display. The at least one secondary support beam is an articulated support beam for suspending a column of one or more LED panels therefrom and wherein the articulation point of each of the at least one secondary support beams as connected to the primary support beam is substantially centered over the center of mass of the one or more LED panels suspended therefrom and the at least one secondary support beam is also a lateral secondary support beam suspended from the lateral primary support beam at the articulation point. A first LED panel is suspended from the first lateral secondary support beam, a second LED panel is suspended from a bottom of the first LED panel, and a plurality of modular frames can be secured together to form the video wall of a selected width and height with LED panels suspended in one or more rows and one or more columns.

The primary support beam is a hollow tubular support beam wherein the at least one secondary support beams are provided within the hollow tubular support for compact space utilization.

The primary support beam is otherwise provided with a channel along its length wherein the at least one secondary support beams are provided within the channel for compact volume.

The primary support beam extends between a first pair of adjacent support columns and wherein a secondary support beam is suspended from and below the primary support beam within a space between the adjacent support columns of the first pair and the first LED panel is suspended from and below the secondary support beam within the space between the adjacent support columns and a second LED panel is suspended from and below the first LED to form a first column of LED panels within the space between the adjacent support columns of the first pair. The primary support beam continues to extend to a third support column spaced apart from one of the support columns of the pair of adjacent support columns forming a second space between adjacent support columns and wherein a second secondary support beam is suspended from and below the primary support beam within this second space and wherein a third LED panel is suspended from the second secondary support beam within this second space and wherein a fourth LED panel is suspended from the third LED panel within this second space.

Opposing ends of each support column are provided with an open channel fixed thereto such that when two assembled modular frames are secured together to form a video wall, a pass through channel is formed at the secured connection of a bottom end of a support column of a first module frame and an upper end of a support column of a second module frame wherein the pass through channel extends from a front face of the modular frame a back side of the modular frame. A stabilizing mechanism comprising a brace, bar, rod, tube, or bracket and for inserting into the pass-thru channel and for securing to a wall behind the modular frame for installation of the modular frame is also provided. A locking mechanism for the stabilizing mechanism within the pass-through channel is also provided. The stabilizing mechanism is further secured to a rear surface of an LED panel to further stabilizing the video wall.

The stabilizing mechanisms have a hollow cross section for accepting cables or wiring routed therethrough.

A plurality of angled guy wires is connected to a ground surface near an assembly of one or more modular frames and extending to a pivotable adjustment bar mounted near a top of one or more columns of LED panels for adjusting or leveling the video wall.

A lever is affixed rigidly to the adjustment bar where a ratio of the length of the lever to the length of the adjustment bar is 2:1 or greater.

Another aspect of the present disclosure relates to a calibration and cleaning system for a video wall. The system has two trolleys, each trolley movable in reciprocal directions along a X axis in cartesian coordinates, wherein a first trolley is positioned for movement along a top of a video wall and a second trolley is positioned for movement along a bottom of a video wall. Four actuators power movement of the two trolleys, one actuator positioned on each of an upper and lower opposing side of the video wall. A cable extends from a first, upper actuator to connect the first and then second trolley and terminates with connection to a second, bottom actuator positioned on a same side of the video wall as the first, upper actuator, and a second cable extends from a third, upper actuator to connection the first and then second trolley and terminates with connection to a fourth, bottom actuator positioned on a same side of the video wall as the third, upper actuator. A carriage is positioned on each of the first and second cable at a location between the first and second trolleys and wherein the cables allow the carriage to move along an X axis in cartesian coordinates and wherein in combination with the movement of the trolleys along the Y axis, the carriage is selectively positionable with respect to a surface of the video wall, where the carriage is configured to carry one or both of calibration equipment and cleaning equipment for the video wall.

The equipment carried by the carriage is in wired or wireless connection with a controller for a display device electronics the video wall for performing calibration or cleaning automatically.

The carriage is configured to operably support one or more selected from the group consisting of a brush, a vacuum hose, a calibration meter for the video wall.

Yet another aspect of the present disclosure relates to a method of assembling a video wall. Assembly includes assembling a first modular frame having one or more columns and rows of LED panels where the first modular frame comprises at least two support columns, a primary support beam, and at least one secondary support beam, wherein the at least two support columns are spaced apart with the primary support beam extending substantially laterally thereacross and suspending the at least one secondary support beam from the primary support beam; and assembling a second modular frame in substantially the same manner as the first modular frame. The method further includes suspending one LED panel from the at least one secondary support beam of each of the first and second modular frames; suspending a subsequent LED panel from the one LED panel to form a column of LED panels for each of the first and second modular frames; and assembling the video wall by securing ends of the support columns of the first modular frame to ends of the support columns of the second modular frame and forming an open channel at one or more connection points between support columns of the first modular frame and second modular frame; and stabilizing the video wall by inserting a stabilizing mechanism through one or more of the open channels and securing an end of the stabilizing mechanism to a vertical surface behind the video wall for installation of the video wall, to a back surface of an LED panel of the first or second module, or combinations thereof.

Leveling the assembled video wall can be done with a plurality of angled guy wires, each connected at one end to a ground surface near the video wall and each connected at an opposing end to a pivotable adjustment bar mounted near a top of one or more columns of LED panels wherein pivoting of the adjustment bar adjusts the lengths of the guy wires and levels the video wall.

Truing the video wall can be done by inserting a lever into a brace connecting the frame to a vertical support surface behind the video wall and using the lever to adjust a vertical angle of one of the first or second modular frame and aligning the first and second modular frame with respect to one another.

The assembled video wall can be calibrated by providing a carriage selectively positionable on an X-Y axis with respect to a surface of the video wall wherein the carriage is movable in the X and Y directions via a system comprising a plurality of trolleys, a plurality of actuators, and a plurality of cables for carrying the carriage and wherein the carriage holds a calibration device for the display.

The assembled video wall can be cleaned by providing a carriage selectively positionable on an X-Y axis with respect to a surface of the video wall wherein the carriage is movable in the X and Y directions via a system comprising a plurality of trolleys, a plurality of actuators, and a plurality of cables for carrying the carriage and wherein the carriage operably holds at least one of a brush and a vacuum device for removing dust and debris from the display.

DETAILED DESCRIPTION

A modular frame to provide support for LED panels to form a video wall, for example, of the type provided in a cinema theater is described herein. The modular frame comprises vertical columns and lateral beams as well as stiffening elements. Each module supporting one or more LED panels and multiple modules may be assembled and secured together to form a video wall in a variety of finished sizes representing an integral number of LED panels.

The modular frame incorporates a support beam along the top comprised of a primary beam which carries the load of the LED panels suspended therefrom, and a plurality of articulated, secondary beams, one for each column of LED panels to be suspended there below. The articulation point or pivot point of the secondary beams is centered over the center of mass of the panels being suspended therefrom. A rectilinear array of LED panels is thereby isolated from the changing deflection of the primary beam under varying degrees of load as the LED wall is assembled.

The modular frame can be provided as a kit wherein the primary suspension beam is constructed as a hollow tube or channel, and the multiple secondary beams are provided enclosed within the hollow interior of the primary beam, thereby minimizing the space required for transport and the completed assembly.

Each frame module is constructed using hollow structural steel tubing for the support columns, with open channels welded to the upper and lower ends of the support columns to form horizontal beams running fore-aft. After a frame module is attached to another module above or below it, the assembled framework forms an open rectangular channel passing all the way through the assembly from the front to the rear of the frame. Side-support stabilizing braces, a bar, rod, tube, or bracket may be inserted into these pass-thru channels from the front or rear of the assembled framework. A side support stabilizing bar may be inserted into a channel opening from the rear side. It is extended outward until it reaches the wall behind. It is attached to the wall, then a locking screw holds it in place inside the frame. Similarly, a side-support bar may be extended out the front and connect to the LED array to help stabilize it against moving air currents or seismic events.

Guy wires may be used for truing the lateral axis of the support frame. Angled guy wires are connected from the floor or ground to ends of an adjustment bar. The adjustment bar is mounted near the top of a column in such a way that it can pivot. The guy wires are provided in a preset, equal length. A lever is affixed rigidly to the adjustment bar. The ratio of the length of the lever to the length of the adjustment bar is 2:1 or more, therefore the force exerted by a person on the end of the lever is magnified to provide a mechanical advantage.

A fore-aft truing apparatus includes a lever that is insertable in a hole through a horizontal frame member, into a side-support brace attached to a wall or other surface to which the frame is secured. By applying pressure to the lever, a person can cause the upper portion of the frame to be leaned toward or away from the wall by a small distance for fine adjustment of the assembly until that segment of the frame is in proper alignment with the other frame segments.

Figure 1:
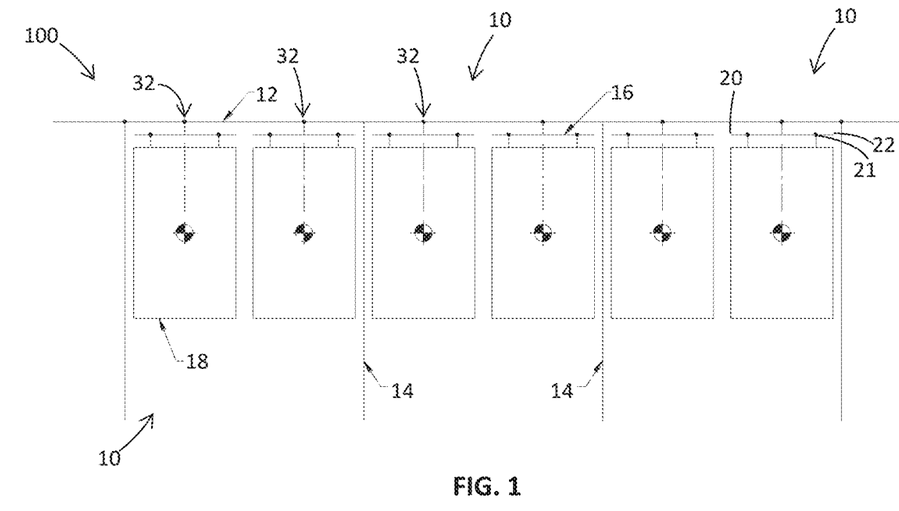
FIG. 1 is a non-scale schematic view of a video wall with a first, lighter LED panel load.
Figure 2:
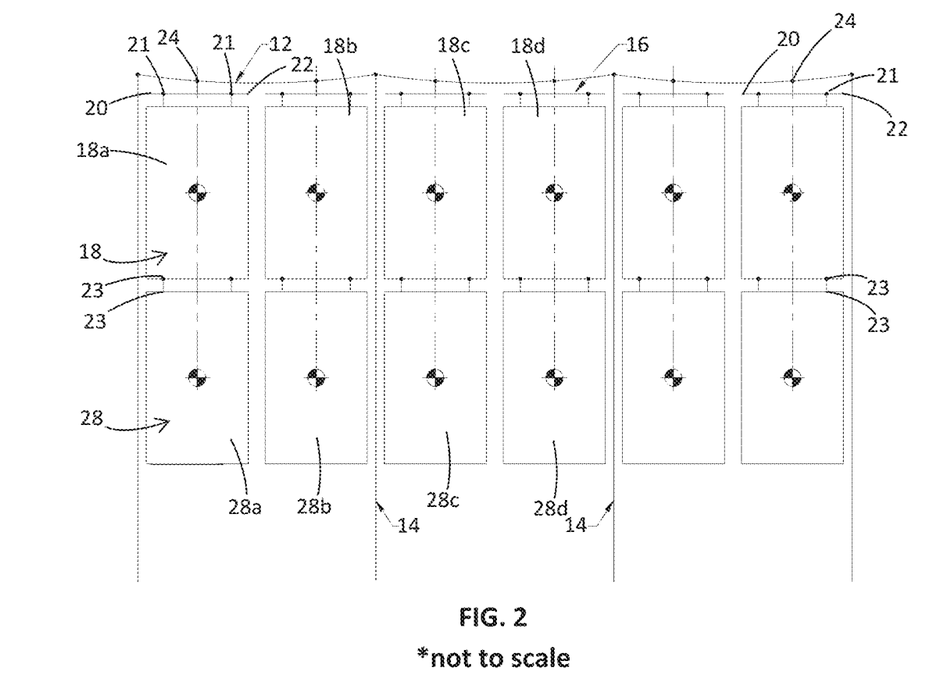
FIG. 2 is another non-scale schematic view of the video wall, with a second, heavier LED panel load.

In further detail and as illustrated in FIG. 1-7, a modular display 100 is illustrated in FIGS. 1-2. The modular display 100 comprises one or more modular frameworks 10 which may be assembled and secured together in vertical and/or horizontal orientation to form a video wall 102. The modular display 100 assembled can be of a selected height and/or width and/or selected to accommodate a selected number of LED panels 18 and 28 supported thereon. While two rows are illustrated, three or more rows are contemplated and within the scope of this disclosure. Each modular framework 10 is a tubular framework with a suspension beam arrangement comprising a primary support beam 12, a plurality of support columns 14, and a plurality of secondary support beams 16. One LED panel 18 may be suspended from each secondary support beam 16, where the secondary support beams 16 are then spaced apart along and suspended from the primary support beam 12 and/or a vertically adjacent secondary support beam 16. In one or more embodiments, the secondary support beams 16 are articulating beams allowing the secondary support beams 16 to automatically adjust or adapt to a change in angle of the primary beam 12 along its length as the weight of a load supported by the framework 10 changes.

In the embodiment illustrated, the primary beam 12 is a generally horizontal upper beam of the framework 10. The primary beam 12 is supported by a plurality of vertically oriented support columns 14 secured thereto. The support columns 14 are spaced apart along a length of the primary beam 14 to accommodate one or more LED panels 18 supported horizontally between each adjacent support column 14. At two or more locations, for example, evenly spaced locations, along the length of the primary beam 12 are load attachment points 32. A connection mechanism is secured at each load attachment point 32 to connect to a secondary support beam 16 such that the secondary beam 16 is secured to the primary beam 12.

Each of the secondary support beams 16 are suspension beams 16 also in a generally horizontal orientation with respect to the primary beam 12. The secondary beams 16 each have a length less than a length of the primary beam 12. Each secondary beam 16 is provided with a mounting mechanism 21 on each opposing end 20, 22 of the secondary beam 16 where these mounting mechanisms 21 are used to secure an LED panel 18 to the secondary beam 16. A center of mass attachment point 24 is positioned near or at the center length of the secondary beam 16 or a location corresponding to the center of mass of the secondary beam 16 when an LED panel 18 is secured thereto. The center of mass attachment point 24 and the load securing point 32 are connected via attachment mechanism 24 which secures the secondary beam 16 to the primary beam 12. When a second row 28a, third row 38a or yet further rows of LED panels 28, 38 are provided below a first row 18a of LED panels 18 that are attached to the secondary beam 16, each subsequent row of LED panels 28a, 28a is secured on opposing ends of the LED panel 28, 38 to the previous row LED panel 18, 28 directly there above. Fastening mechanisms 23 can be used to secure ends of panels 18a, 28a together for suspending multiple panels in each column.

The primary support beam 12 may be constructed from lighter materials than support beams of the prior art constructions as the framework 10 arrangement reduces the effects from the deflection of the beam. The plurality of secondary beams 16 are connected or secured to the primary beam 12 and are centered over the center of mass of the LED panels 18 being suspended. As the load attachment points 32 on the primary support beam 12 are evenly spaced, as the primary beam 12 deflects with added load the connection points 32 for each column of suspended LED panels 18, 28 each row of LED panels remains at substantially equal height. So as load is applied in the form of additional LED rows being added to the framework 10, the entire array will gradually lower in height, but will do so evenly over the entire array. The stress on individual LED frames 18, 28 is thereby reduced. This also results in a simplified assembly process.

Any one or more of the attachment points described herein and/or any one or more connection points of support elements or other components may be comprised of weldments and/or fasteners of various types, including but not limited to brackets welded or otherwise securely fixed to each component for assembly and the brackets secured together by nuts and bolts or other fasteners.

In prior art frames for supporting LED panels, formed steel sheets of 3 mm or greater thickness would be used to keep the deflection of the beam below ~2 mm. The framework 10 according to one or more embodiments described herein may utilize steel with a thickness reduced by as much as half of the prior art thicknesses. As such, the primary beam 12 according to embodiments herein may be formed from steel sheets having a thickness of less than 3 mm, or in the range of about 1.5 mm to about 3.0, or in the range of about 2.0 mm to about 2.5 mm. Even when the resulting beam deflection is increased with the load increase on the framework 10, the increased deflection does not distort the overall image formed by the plurality of rows and columns of the LED panels forming the wall and supported by the framework 10. Deflection in the beams 12, 16 of the framework 10 does not induce stress in the individual LED panels. Conversely, the steel beams 12, 14, 16 may have a thickness of 3.0 mm or greater, which allows the spacing of the support columns 14 to be increased and the number of support columns 14 for the primary beam 12 to be reduced. For example, rather than providing a support column 14 after every two adjacent LED panels 18, 28 in a row 18a, 28a support columns may be provided every three or four LED panels 18, 28, thus reducing the number of upright frames required to support the system.

In one embodiment, the framework 10 comprises a primary suspension beam 12 that may be constructed as a hollow tube, with the secondary beams 16 provided within the hollow tube, thereby minimizing transport space and costs and reducing the space required for the framework 10.

The framework 10 may be a rectilinear frame and as the framework 10 is comprised of horizontal and vertical members, the framework 10 may require lateral stabilization. For example, guy wires can be installed from anchor points on a floor or ground surface and extending to extremities of upper part of the frame as shown schematically in FIG. 3.

Figure 3:
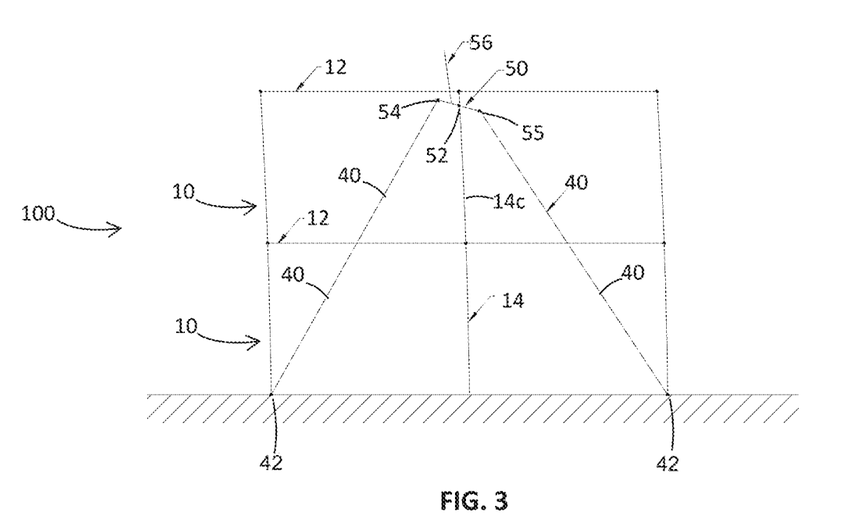
FIG. 3 is a front view of a lateral truing system for the video wall before truing the video wall.
Figure 4:
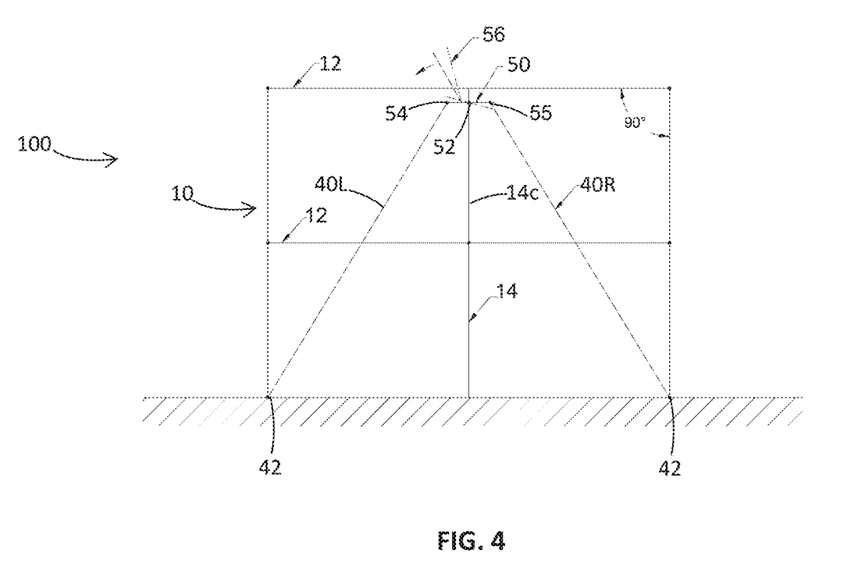
FIG. 4 is a front view of a lateral truing system for the video wall after truing the video wall.

In embodiments described herein and illustrated in FIGS. 3-4, a practical space-saving implementation of a lateral stabilization mechanism includes positioning guy wires 40 at a center support column 14c of the framework 10. This can be done when the horizontal beams 12, 16 can accept expansive and compressive forces. The guy wires 40 can connect at a floor or ground surface to the same anchor points 42 that secure the adjacent columns, thereby reducing the number of connection points and hardware required.

Truing the framework 10 more easily and rapidly can be done by the addition of an articulated adjustment bar 50 located near the upper primary support beam 12. The adjustment bar 50 may be connected at its center 52 to the central support column 14c, and the guy wires 40 connected to opposing ends 54, 55 of the adjustment bar 50. A lever 56 may also be affixed solidly to the adjustment bar 50. The guy wires 40 may still incorporate turnbuckles, or other means of length adjustment which are preset to an equal length.

A length of the adjustment bar 50 is substantially less than the length of the lever 56, therefore the force exerted by a person at the end of the lever 56 is magnified at the guy wires 40. For example, in the event the columns of the assembled framework 10 lean toward the left. The adjustment bar 50 and guy wires 40 are attached to the framework 10. The length of one or both guy wires 40 are then tightened to remove excess slack from the wires 40. Because the entire frame 10 is leaning to the left, the center of the upper beam 12 will be closer to the left column base than it is to the right column base, so the guy wire 40 on the left will have more slack and the guy wire 40 on the right will have less slack. When the guy wires 40 are attached to the adjustment bar 50, the bar 50 will automatically assume a slant to adapt to the lengths of the two guy wires 40 as shown in FIG. 3.

At this juncture, a person of sufficient strength may exert force on the adjustment lever 56 in the appropriate direction to cause the adjustment bar 50 to be horizontal, in the case of the illustrated embodiment, pushing the lever 56 toward the left. This simultaneously creates tension in the right guy wire 40R and slack in the left guy wire 40L, which causes the columns to move toward the right at their upper ends, therefore the vertical columns become truly vertical and orthogonal to the horizontal members as illustrated in FIG. 4.

Various means may be used to verify the adjustment is correct, such as a conventional bubble level, measuring tapes, lasers, or other similar means. When the columns are plumb, that is, vertical to the desired accuracy, a locking device on the adjustment bar 50 may be secured. The length of the guy wires 40 can then be finely adjusted to set the desired tension in the guy wires 40. This completes the truing procedure.

There may be other diagonal or corner braces installed after this procedure to maintain the trueness of the frame that has been established. In that case the guy wires and adjustment bar may be removed afterward and used again elsewhere.

In one or more embodiments, the lever 56 used to make the manual truing adjustment may be a standard socket wrench or breaker bar several feet in length which provides sufficient leverage, and which is commonly available and relatively inexpensive. After adjustment, the socket wrench may be removed and subsequently used at another location for a similar purpose.

Figure 6:
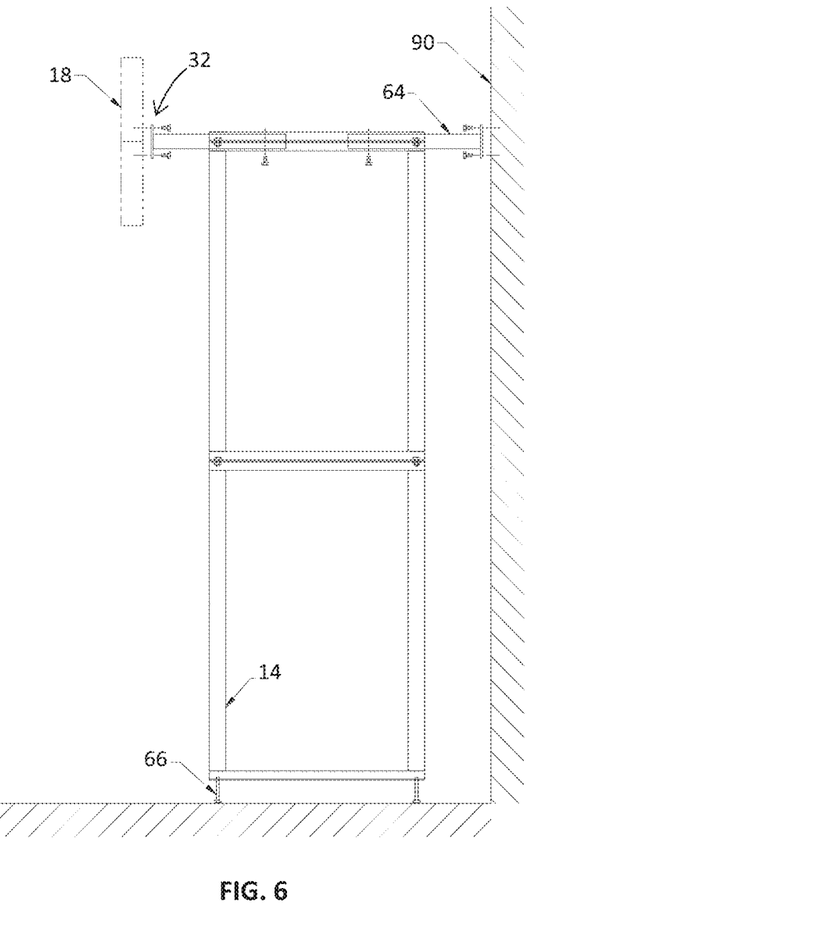
FIG. 6 illustrates an assembly modular frame stabilized to a wall at the rear and supporting LED panels thereon.

To avoid a more rugged, more expensive modular frame assembly than necessary, it is convenient and common in the art to secure the LED support frame to a load-bearing wall directly behind it as illustrated in FIG. 6. In this way the wall provides much of the lateral stability, without requiring additional bracing to the floor. To be effective, this connection to the wall must be done at multiple points distributed around the frame. A means is required to create a rugged connection between the frame and the wall behind it. This connection requires adjustability in order to compensate for a wall surface that may not be flat, and for fine adjustment to keep the top of the frame sufficiently straight.

Figure 5A:
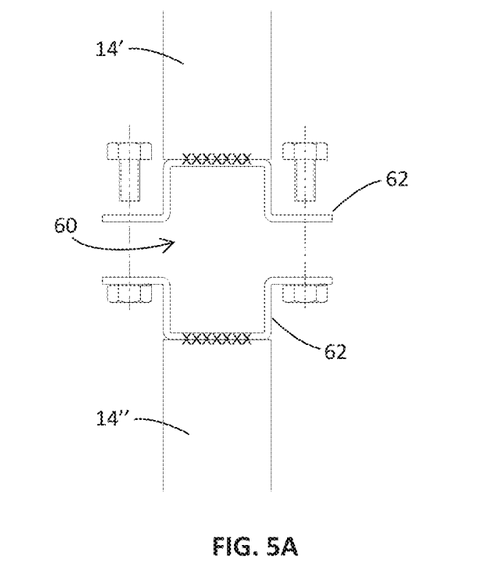
FIG. 5A is a front view of a connection between adjacent support columns of display modules showing a pass-through connection of two support columns prior to assembly.
Figure 5B:
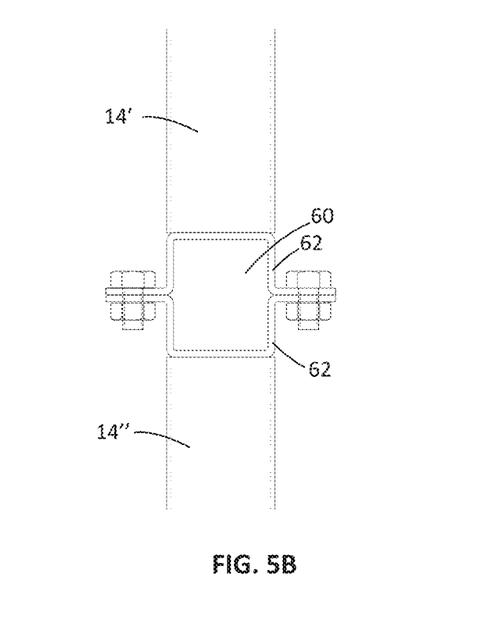
FIG. 5B is a front view of the assembled connection between adjacent display modules showing a pass-through connection of two support columns.

In one or more embodiments described herein, the framework 10 is provided with a plurality of column weldments or modules that are of the same design, which are then stacked and attached one on top of the other to obtain an overall desired height. Each framework 10 module is constructed with hollow structural steel tubing for the support columns 14', 14" and openings 60 are formed when support columns are secured together. Open channel connectors 62 are welded to ends of the support columns 14', 14" to form horizontal beam opening 60 running fore-aft. When one column assembly is attached to the top of the one below it, it creates the open rectangular channel 60 passing all the way through the assembly from the front to the rear of the framework 10 as illustrated in FIG. 5.

This assembly allows a support 64 bar to be inserted from the rear of the framework 10 to connect to the wall behind it, thereby stabilizing the framework 10 to the wall. It also enables a similar bar or bracket to be inserted in the front side of the framework 10 that may be connected to the LED wall array to help stabilize it against moving air currents within the room. As illustrated in FIGS. 5-6. It is further contemplated that AC power cables and signal delivery cables may also be routed through pockets left between the column modules.

As mentioned previously above, there is a need for keeping the top of the modular framework 10 as linear (e.g. straight) from one end of it to the other when one or more LED panels 18, 28 are suspended therefrom. With adjustable levelers 66 positioned at the bottom of each support column 14 in contact with a ground surface of each modular framework 10, it is further possible to make small or fine adjustments at the bottom of the support columns to correct any tilt forward or back of the display 100 and to align each columns of LED panels 18, 28, 38 to be in the same fore-aft plane as adjacent columns of LED panels 18, 28.

Figure 7:
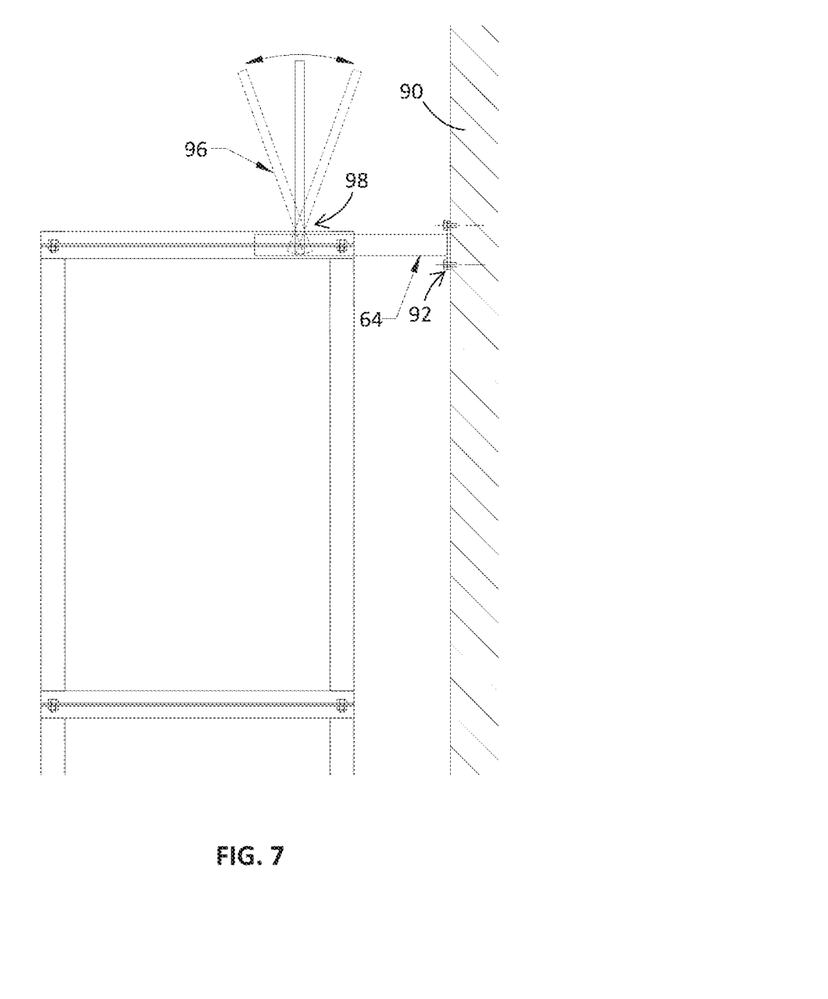
FIG. 7 is another schematic view of the fore-aft or z axis truing system for the video wall after truing the video wall framework.

Modular frameworks 10 and/or modular displays 100 may be forty (40) or more feet in height so there is some flex inherent in each vertical column. Thus, mechanism is provided to move the top of the display 100 closer to or further from a load bearing installation wall 90 on the order of a few millimeters using leverage to the wall 90 at attachment points 92 to lean the display 100 a fraction of a degree. Each modular framework 10 incorporates one or more lateral support braces or bars 64 for securing to the wall 90 and adjusting the levelers 66 can include using an adjustment lever 96 inserted in to a corresponding aperture 98 in a fixed portion of the modular framework 10 which corresponds to a matching aperture in the lateral braces 94. The rigid lever 96, such as a tire iron, crowbar, or jack bar approximately one-inch in width and a few feet in length can be inserted to provide sufficient leverage for leveling the display 100. With the support braces 94 at the top of the framework 10 affixed to the wall 90, by applying pressure to the lever 96 the framework 10 can be moved toward or away from the wall 90 by a small distance, until, for example the primary beam at the top of the frame is straight.

The assembled display 100 and LED panels 18, 28 supported thereon according to one or more embodiments herein requires calibration and cleaning from time to time. A calibration and cleaning installation 70 is illustrated generally in FIGS. 8 and 9. The calibration and cleaning installation 70 is an X, Y positioning system per a cartesian coordinate system. The calibration and cleaning installation 70 is configured for mounting in front of a display where the display may have a varying and/or great height and width as a plurality of modules 10 may be secured together.

Figure 8:
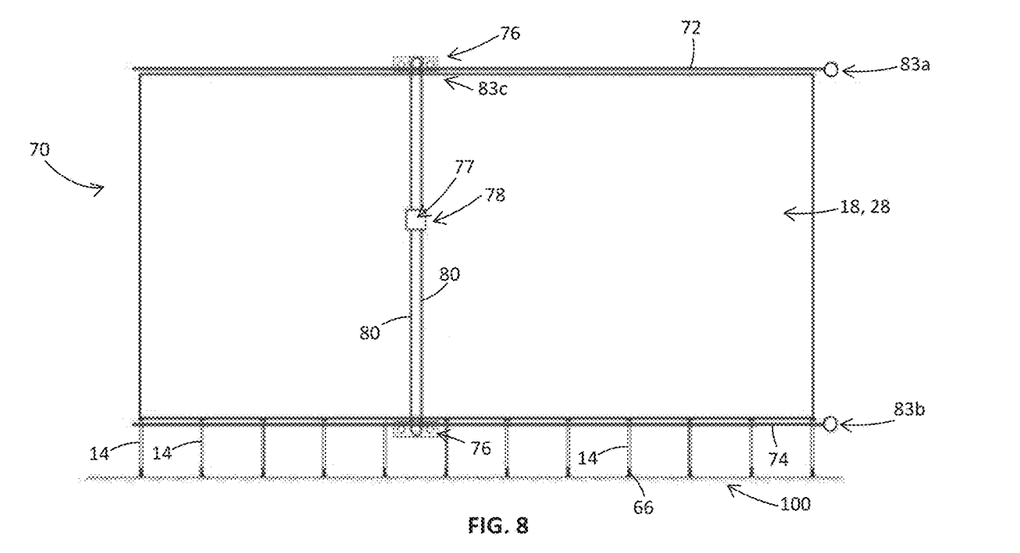
FIG. 8 is schematic view of a calibration and cleaning system for a video wall.
Figure 9:
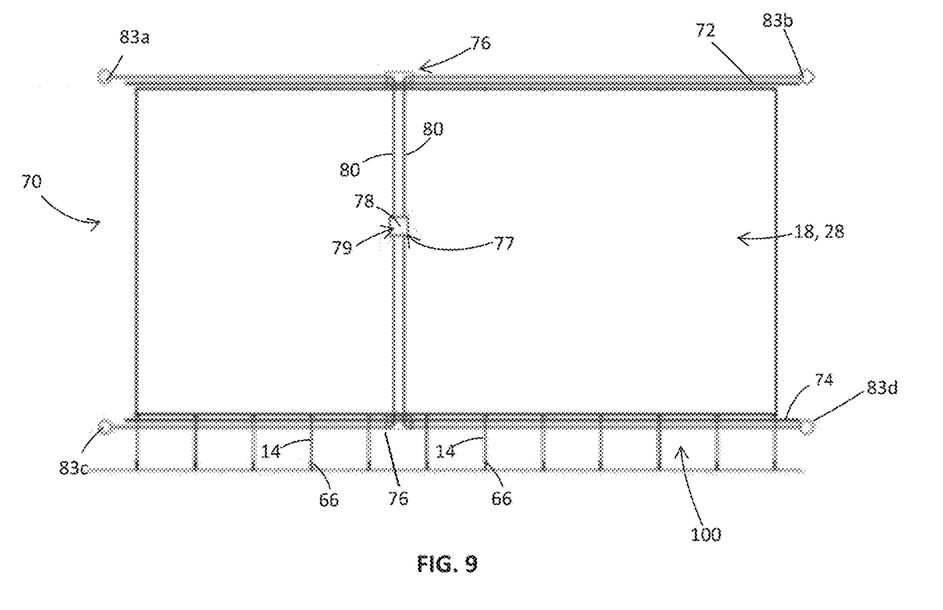
FIG. 9 is a schematic view of another embodiment of the calibration and cleaning system for the video wall.

The calibration and cleaning installation 70 comprises a carriage 78 that is moveable to one or more X, Y positions with respect to a surface area of the display surface comprising the LED panels 18, 28. The carriage is movable in reciprocal directions along both an X axis and one or more Y axes. For example, the carriage is movable horizontally and vertically to reach any location on the surface area of the display surface.

A track 72 is provided that runs substantially horizontally above or near the top of the display surface and a second track 74 provided running parallel thereto and positioned below or near the bottom of the display surface. The tracks 72, 74 are positioned so as not to obstruct the display surface visibility. Two moving trolleys 76 are provided with one trolley 76 operably connected to each track 72, 74. The trolleys 76 may slide, crawl or otherwise move in reciprocal directions along the track 72, 74. In the embodiments illustrated, the trolleys 76 are spaced apart about the display surface and may move in tandem with one another. One or more carriages 78 are vertically moveable along the space between the trolleys 76 via one or more cables 80 operably extending between the trolleys 76. The carriage 78 is secured to the cables 80 which extend vertically in operable connection with each trolley 76. The one or more cables 80 are support cables 80 that allow the carriage to move in reciprocal vertical directions between the trolleys 76 as the trolleys 76 move in horizontal directions about the display surface.

In one or more embodiments where there is no rigid carriage connected between the upper and lower track, there are two horizontal actuators required, one at the top and one at the bottom of the frame. These actuators must be synchronized in order to keep the carriage and cables oriented on a vertical axis. The vertical actuator is mounted on one of the two trolleys, or on the carriage itself.

The carriage 78 is attached to the support cable(s) 80 in such a way that the carriage 78 may be driven upward and downward and may be moved to the left and right by movement of the trolleys 76. For example, in the embodiment illustrated in FIG. 8, three motor-driven actuators are provided. A first actuator 83a is positioned at an upper right corner and is configured to move the upper trolley 76 horizontally (e.g., left and right) on the track 72. A second actuator 83b is positioned at a lower right corner and is configured to move the lower trolley 76 horizontally (e.g., left and right) on the track 74. A third motor-driven actuator 83c is located on either trolley 76, which then drives the carriage 78 up and down by means of cables 80. By using the three actuators 82a, 82b, 82c in combination, the carriage 78 can be positioned anywhere in front of the display 100. In such an embodiment, an electrical cable is connected to the third motor-driven actuator 83c, which moves across the full width of the display. A cable management system may be provided to manage the electrical cable and prevent the cable from interfering with the display.

An alternative embodiment is illustrated in FIG. 9, where four motor-driven actuators are used, with one motor driven actuator 83a, 83b, 83c, 83d positioned in each corner of the display. With all four motor-driven actuators 83a, 83b, 83c, 83d in fixed position, the actuators 83a, 83b, 83c, 83d have fixed electrical connections. The trolleys 76 are completely passive and are allowed to simply roll in or along the tracks 72, 74. To define the movement, the motors-driven actuators 83a, 83b, 83c, 83d provide movement in one of four quadrants including upper left 83UL, upper right 83UR, lower left 83LL, and lower right 83LR with movement as defined by the table below.

| Movement | 83UL action | 83UR action | 83LL action | 83LR action |
|---|---|---|---|---|
| Right | Payout | Takeup | Payout | Takeup |
| Left | Takeup | Payout | Takeup | Payout |
| Up | Takeup | Takeup | Payout | Payout |
| Down | Payout | Payout | Takeup | Takeup |

Diagonal movement of the carriage is possible by combining multiple of these functions.

The distance between the carriage 78 and a front surface of LEDs 18, 28, 38 in the Z axis is maintained by the position of the upper and lower track 72, 74 and its design along with the trolleys 76 that ride on each track 72, 74. The distance is sufficient to effect calibration and/cleaning of the display surface and such that the panels are not damaged by trolleys 76, carriage 78 or cables 80.

For calibration and measurement as relates to the LED panels 18, 28 and/or visual display 100, the carriage 78 is first equipped with the appropriate meter 79 or other instrumentation required for calibration and/or measurement. The system may incorporate cable-handling devices to manage the location of meter connection cables and other cables 80 to keep said cables out of the way of carriage 78 movement, or, for example, the meter 79 may be powered by a battery and the data transmitted by a wireless signal to a controller.

Figure 10:
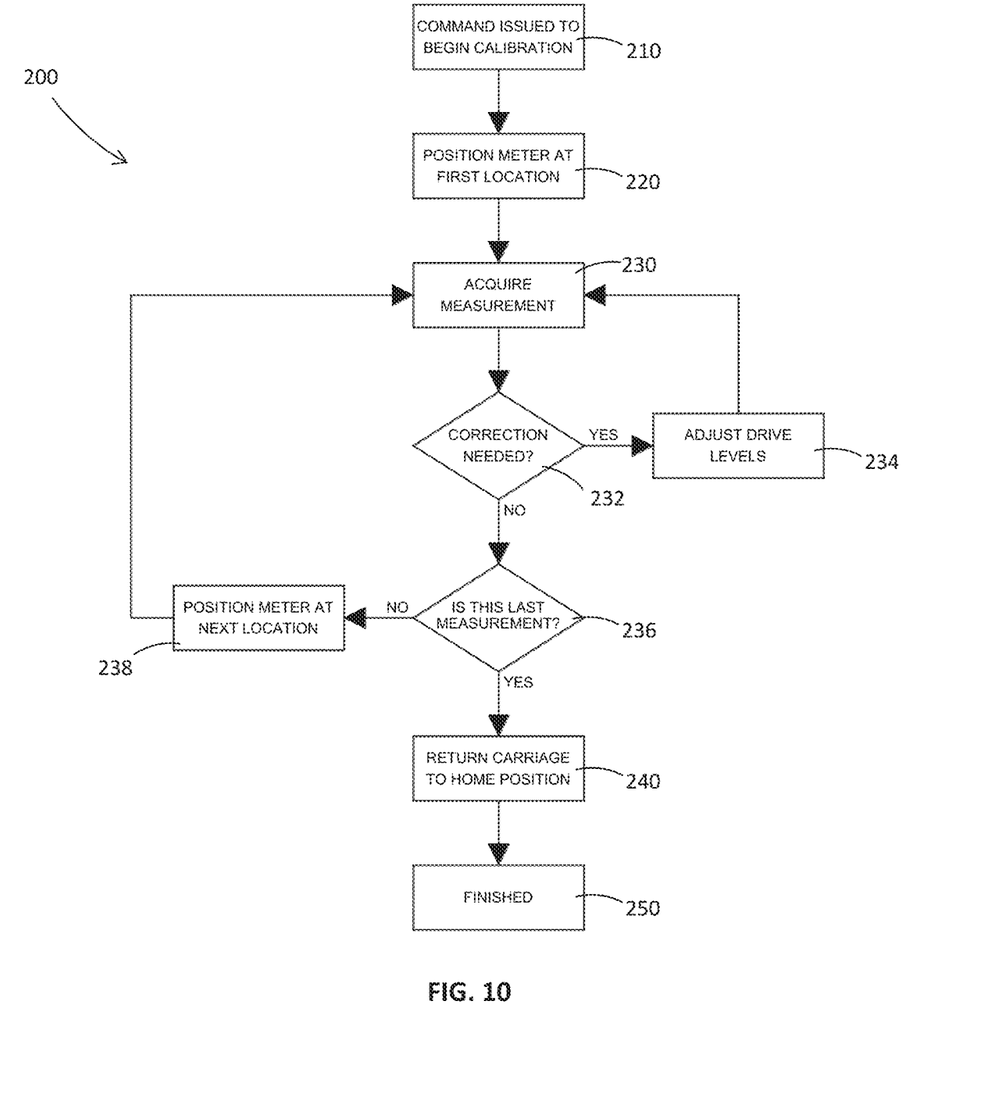
FIG. 10 is a flow chart of a method of calibrating the display of the video wall.

Once the carriage is equipped with the meter 79 device, the carriage 78 may then be moved for positioning at an area of interest, either manually by the operator by issuing instructions to the carriage position control system; or in an automatic fashion as shown in the flowchart in FIG. 10. The method 200 includes issuing a command to begin calibration manually or automatically at step 210, positioning the meter at a first location at step 220 and acquiring a measurement at step 230. If correction is needed as determined at step 232 the drive levels may be adjusted at step 234 and step 230 repeated as needed. If no correction is needed, it is determined whether or not the acquired measurement was a last measurement at step 236. If not the last measurement, the meter is positioned at a next location at step 238 and step 230 is repeated and so on. If the measurement is the last measurement as determined at step 236, the carriage is retuned to a home position at step 240 where home position is a position not obstructing the view of the display 100.

The assembly 70 may also be used for cleaning the surface of the display 100 and to do so the carriage 78 may be equipped with a cleaning attachment 77 such as a brush and/or vacuum hose attachment with or instead of the meter 79. The assembly 70 then functions in substantially the same manner for cleaning with selected positioning of the carriage 78 for cleaning. The process may be automatic where the carriage 78 is activated at one side at a top of the display, travels across the width of the display 100, then as the carriage 78 reaches the end, the carriage 78 moves downward and returns back across the width. This process is repeated until the carriage 78 reaches the bottom of the display.

With either use, whether for calibration of the display or for cleaning, the carriage 78 and vertical support cables 80 may be removed and stored away after use so as not to be visible during use of the display.

Although the present disclosure has been described with reference to preferred embodiments, workers skilled in the art will recognize that changes may be made in form and detail without departing from the spirit and scope of the disclosure.

The invention claimed is:

1. A modular frame for supporting one or more LED panels to form a video wall, the modular frame comprising:
a framework comprising at least two support columns, a primary support beam and at least one secondary support beam wherein the at least two support columns are spaced apart with the primary support beam extending substantially laterally thereacross, and a plurality of stiffening elements;
wherein the at least one secondary support beam is an articulated support beam for suspending a column of one or more LED panels therefrom and wherein the articulation point of each of the at least one secondary support beams as connected to the primary support beam is substantially centered over the center of mass of the one or more LED panels suspended therefrom,
wherein the at least one secondary support beam is also a lateral secondary support beam suspended from the lateral primary support beam at the articulation point, wherein a first LED panel is suspended from the first lateral secondary support beam,
wherein a second LED panel is suspended from a bottom of the first LED panel, and
wherein a plurality of modular frames can be secured together to form the video wall of a selected width and height with LED panels suspended in one or more rows and one or more columns.

2. The modular frame of claim 1 wherein the primary support beam is a hollow tubular support beam wherein the at least one secondary support beams are provided within the hollow tubular support for a compact volume.

3. The modular frame of claim 1 wherein the primary support beam is otherwise provided with a channel along its length wherein the at least one secondary support beams are provided within the channel for a compact volume.

4. The modular frame of claim 1 wherein the primary support beam extends between a first pair of adjacent support columns and wherein a secondary support beam is suspended from and below the primary support beam within a space between the adjacent support columns of the first pair and the first LED panel is suspended from and below the secondary support beam within the space between the adjacent support columns and a second LED panel is suspended from and below the first LED to form a first column of LED panels within the space between the adjacent support columns of the first pair.

5. The modular frame of claim 4 and wherein the primary support beam continues to extend to a third support column spaced apart from one of the support columns of the pair of adjacent support columns forming a second space between adjacent support columns and wherein a second secondary support beam is suspended from and below the primary support beam within this second space and wherein a third LED panel is suspended from the second secondary support beam within this second space and wherein a fourth LED panel is suspended from the third LED panel within this second space.

6. The modular frame of claim 1 wherein opposing ends of each support column are provided with an open channel fixed thereto such that when two assembled modular frames are secured together to form a video wall, a pass through channel is formed at the secured connection of a bottom end of a support column of a first module frame and an upper end of a support column of a second module frame wherein the pass through channel extends from a front face of the modular frame to a back side of the modular frame.

7. The modular frame of claim 6 and further comprising a stabilizing mechanism comprising a brace, bar, rod, tube, or bracket and for inserting into the pass-thru channel and for securing to a wall behind the modular frame for installation of the modular frame.

8. The modular frame of claim 7 and further comprising a locking mechanism for the stabilizing mechanism within the pass through channel.

9. The modular frame of claim 7 wherein the stabilizing mechanism is further secured to a rear surface of an LED panel to further stabilize the video wall.

10. The modular frame of claim 6 wherein the stabilizing mechanisms have a hollow cross section for accepting cables or wiring routed therethrough.

11. The modular frame of claim 1 and further comprising a plurality of angled guy wires for connected to a ground surface near an assembly of one or more modular frames and extending to a pivotable adjustment bar mounted near a top of one or more columns of LED panels for adjusting or leveling the video wall.

12. The modular frame of claim 11 and further comprising a lever affixed rigidly to the adjustment bar where a ratio of the length of the lever to the length of the adjustment bar is 2:1 or greater.

13. A method of assembling a video wall comprising:
- assembling a first modular frame having one or more columns and rows of LED panels where the first modular frame comprises at least two support columns, a primary support beam, and at least one secondary support beam, wherein the at least two support columns are spaced apart with the primary support beam extending substantially laterally thereacross and suspending the at least one secondary support beam from the primary support beam;
- assembling a second modular frame in substantially the same manner as the first modular frame;
- suspending one LED panel from the at least one secondary support beam of each of the first and second modular frames;
- suspending a subsequent LED panel from the one LED panel to form a column of LED panels for each of the first and second modular frames;
- assembling the video wall by securing ends of the support columns of the first modular frame to ends of the support columns of the second modular frame and forming an open channel at one or more connection points between support columns of the first modular frame and second modular frame; and
- stabilizing the video wall by inserting a stabilizing mechanism through one or more of the open channels and securing an end of the stabilizing mechanism to a vertical surface behind the video wall for installation of the video wall, to a back surface of an LED panel of the first or second module, or combinations thereof.

14. The method of claim 13 and further comprising leveling the video wall with a plurality of angled guy wires, each connected at one end to a ground surface near the video wall and each connected at an opposing end to a pivotable adjustment bar mounted near a top of one or more columns of LED panels wherein pivoting of the adjustment bar adjusts the lengths of the guy wires and levels the video wall.

15. The method of claim 13 and further comprising truing the video wall by inserting a lever into a brace connecting the frame to a vertical support surface behind the video wall and using the lever to adjust a vertical angle of one of the first or second modular frame and aligning the first and second modular frame with respect to one another.

16. The method of claim 13 and further comprising calibrating a display of the video wall by providing a carriage selectively positionable on an X-Y axis with respect to a surface of the video wall wherein the carriage is movable in the X and Y directions via a system comprising a plurality of trolleys, a plurality of actuators, and a plurality of cables for carrying the carriage and wherein the carriage holds a calibration device for the display.

17. The method of claim 13 and further comprising cleaning the display of the video wall by providing a carriage selectively positionable on an X-Y axis with respect to a surface of the video wall wherein the carriage is movable in the X and Y directions via a system comprising a plurality of trolleys, a plurality of actuators, and a plurality of cables for carrying the carriage and wherein the carriage operably holds at least one of a brush and a vacuum device for removing dust and debris from the display.

* * * * *